United States Patent [19]

Taylor, Jr.

[11] 3,906,498

[45] Sept. 16, 1975

[54] RADAR INTERFACE METHOD AND SYSTEM

[75] Inventor: John W. Taylor, Jr., Baltimore, Md.

[73] Assignee: Westinghouse Electric Corporation, Pittsburgh, Pa.

[22] Filed: May 24, 1973

[21] Appl. No.: 363,776

[52] U.S. Cl. .......................................... 343/17.1 PF
[51] Int. Cl.² ........................................... G01S 7/30
[58] Field of Search ................. 343/17.1 R, 17.1 PF

[56] References Cited
UNITED STATES PATENTS

| | | | |
|---|---|---|---|
| 3,229,288 | 1/1966 | Massey | 343/17.1 PF |
| 3,422,435 | 1/1969 | Cragon et al. | 343/17.1 R |
| 3,448,451 | 6/1969 | Wilcox | 343/17.1 R |
| 3,480,953 | 11/1969 | Shreve | 343/17.1 PF |
| 3,662,386 | 5/1972 | Bryant | 343/17.1 PF |

Primary Examiner—Maynard R. Wilbur
Assistant Examiner—G. E. Montone
Attorney, Agent, or Firm—D. Schron

[57] ABSTRACT

A method and system for interfacing a variable interpulse period radar system with a fixed interpulse period output device is disclosed. The radar interpulse period is varied in a predetermined manner about an average interpulse period so that the sum of a predetermined plural number of varying interpulse periods is an integral multiple of the average period. The output interpulse period may then be a fixed submultiple of the average period. Target information for multiple radar transmissions is combined by a signal summing technique to prevent loss or degradation of target detectability. In accordance with the disclosed summing technique, a current target information signal is summed with a fractional portion of previously stored target data and the sum is then stored for further use.

25 Claims, 7 Drawing Figures

MTI OUTPUT SIGNAL RESPONSE

DIGITAL TARGET EXTRACTOR

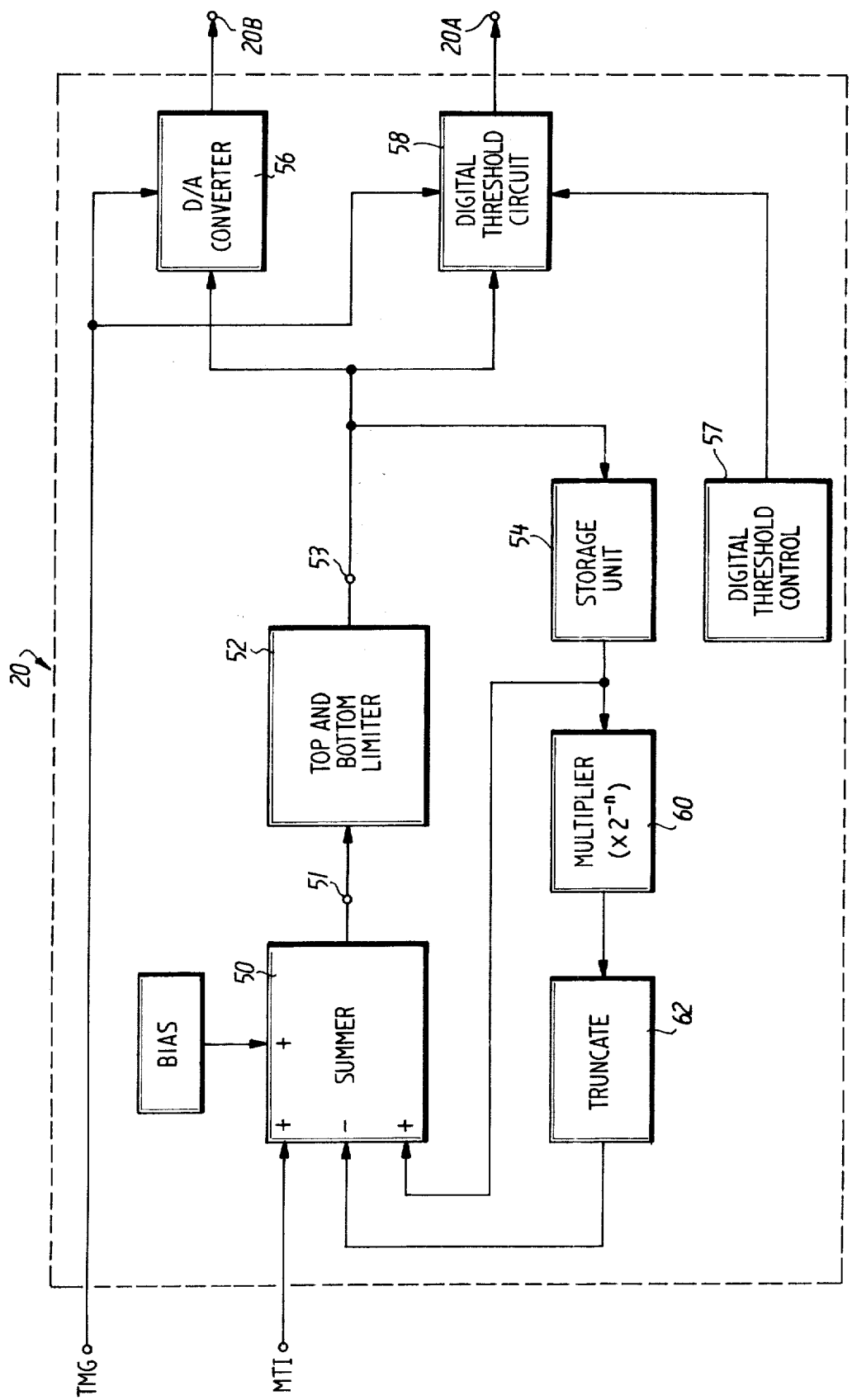
FIG. 4 OUTPUT INTERFACE UNIT

RADAR INTERFACE METHOD AND SYSTEM

BACKGROUND OF THE INVENTION

1. Field of the Invention

The invention relates to radar systems and, more particularly, to a method and system for interfacing a variable interpulse period radar system with output devices operable at a substantially constant interpulse period.

2. Description of the Prior Art

In a typical search radar system, an antenna is scanned in azimuth and target echoes are received and processed to provide various types of displays. A target echo is usually received by the radar receiving system for each of several radar transmissions as the antenna scans a target in azimuth and resultant target information for the several transmissions is utilized to determine target position.

Most search radar systems employ a variable interpulse period, i.e., a variable period between adjacent pulses, to achieve reliable target detectability. For example, in a search radar receiving system employing a moving target indicator (MTI) to suppress the processing of target information indicating zero or very low velocity, blind speeds (i.e., velocities at which the detectability is seriously degraded) may result if the interpulse period is not varied from pulse to pulse. However, output devices such as plan position indicators (PPI) and digital target extractors often require a substantially constant interpulse period for proper operation.

For example, PPI displays often have recovery time limitations which cause the presentation to jitter if the interval between the end of one sweep and the start of the next sweep varies on a pulse-to-pulse basis. Similarly, digital target extractors often employ drum storage and the rotation of the drum must be synchronized to the output interpulse period. With either type of output device, a rapid variation in the interpulse period usually cannot be tolerated without complex interfacing between the radar receiving system and the output units.

One solution to this problem has been the use of a "Destagger" unit to buffer the output interpulse period. A typical "Destagger" unit may include a series of switch delay lines or the digital equivalent thereof and available increments of delay lines or shift registers limit the choice of interpulse period increments. This may be particularly troublesome in that a large number of interpulse periods, comparable to the number of pulses per radar beam width, are required to prevent an ambiguous display of echoes from large aircraft at a range in excess of the minimum interpulse period of the radar. The implementation of a "Destagger" unit to buffer the interpulse period between the radar receiving system and the output devices may therefore be quite complicated and thus very expensive.

OBJECTS AND SUMMARY OF THE INVENTION

It is accordingly an object of the present invention to provede a novel method and system which obviate these and other problems associated with the interfacing of variable interpulse period radar systems with output devices.

It is a further object of the present invention to provide a novel method and variable interpulse period radar system in which target information output signals appear to the output devices to have a fixed repetition frequency.

It is another object of the present invention to provide a novel method and system for operating a search radar at a varying interpulse period while operating the radar output devices at a fixed interpulse period less than the average of the varying interpulse period without degrading target detectability.

These and other objects and advantages are accomplished in accordance with the present invention through the selection of a radar interpulse period which varies in a predetermined manner about an average interpulse period and through selection of a fixed output interpulse period which is a predetermined submultiple of the average radar interpulse period. Since the output interpulse period is a submultiple of the average radar interpulse period, the latent target information for multiple radar transmissions is combined and the signals provided to the output devices are derived from the combined target information thereby preventing degradation of target detectability.

In a preferred embodiment of the present invention, target information signals are derived from reflected pulses of wave energy transmitted at intervals which vary in accordance with a predetermined sequence in which the sum of the varying intervals in consecutive groups of the varying intervals, each containing a like plural number of intervals, is a constant. The target information signals derived from the reflected pulses of wave energy are combined, preferably through the use of a feedback integrator, over each constant period or interval defined by the sum of the plural intervals in the groups of intervals and the combined target information signals are utilized to generate an output signal at fixed intervals each equal in length to the sum of the predetermined plural number of intervals.

BRIEF DESCRIPTION OF THE DRAWINGS

FIG. 4 is a functional block diagram of a preferred embodiment of the output interface unit of FIG. 1; and, FIGS. 5 and 6 are graphs illustrating the operation of the output interface unit of FIG. 4.

DETAILED DESCRIPTION

Figure 1:
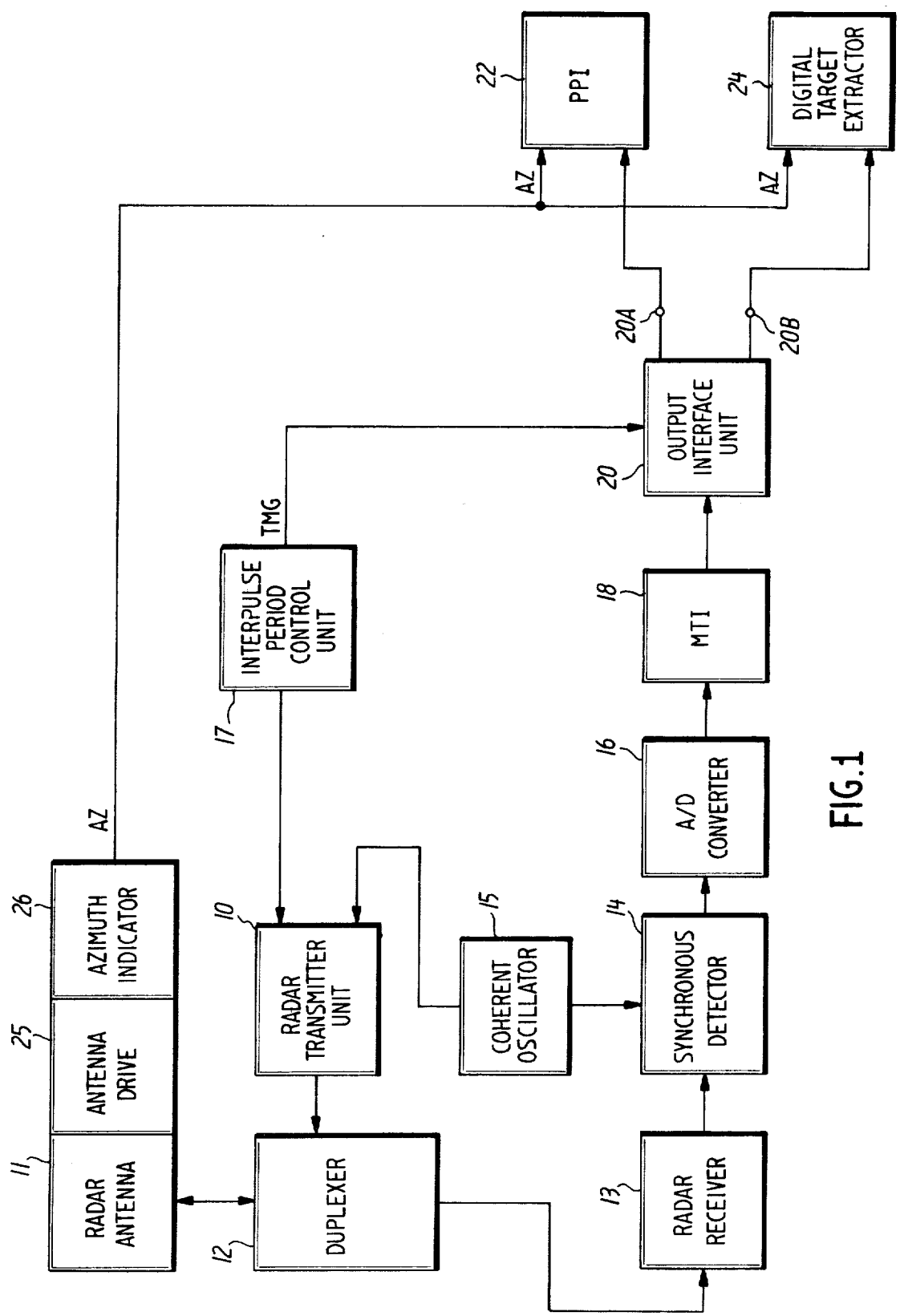
FIG. 1 is a functional block diagram illustrating a search radar system operable in accordance with the present invention.

FIG. 1 functionally illustrates a search radar system operable in accordance with the present invention. A radar transmitter 10 preferably transmits pulses of wave energy from a radar antenna 11 via a suitable duplexer 12. The period between pulses may be controlled in a suitable manner by an interpulse period control unit 17 which varies the radar interpulse period in accordance with a predetermined sequence hereinafter described in detail. A radar receiver 13 receives target echoes, i.e., return wave energy, via the duplexer 12 as the radar antenna 11 is scanned in azimuth.

The output signal from the radar receiver 13, typically an intermediate frequency (IF) signal, is applied to a conventional synchronous detector 14 for detection of return or echo signals in response to the output signal from a coherent oscillator 15. To supply an appropriate signal to the detector 14, the coherent oscillator 15 is usually associated with the transmitter unit 10 either to supply a signal to the transmitter unit 10 where the transmitter is a pulsed amplifier or to sample and phase lock to the transmitter unit output signal where the transmitter is an oscillator such as a magnetron.

The output signal from the synchronous detector 14 may be converted to a digital signal by a suitable analog to digital converter 16 and the digital signal may be applied to a suitable conventional moving target indicator (MTI) 18. According to the present invention, the output signal from the moving target indicator 18 is applied to an output interface unit 20 hereinafter described in greater detail. The output interface unit 20 may supply output signals via respective output terminals 20A and 20B to one or more output units such as the illustrated PPI radar display 22 and a digital target extractor 24.

The radar antenna 11 may be driven by a suitable conventional drive unit 25 associated with a conventional antenna azimuth indicator 26. An azimuth signal AZ from the antenna azimuth indicator 26 may also be applied to each of the output units 22 and 24 as required. A timing signal TMG having an interpulse period related to the interpulse period of the transmitted pulses of wave energy may be supplied to the output interface unit 20 from the interpulse period control unit 17 or from any other suitable source in the radar system.

In a typical radar system, a target echo is received by the radar receiver 13 for each of several radar transmissions from the transmitter 10 as the antenna scans a target in azimuth. Any target echo or return signal is detected by a synchronous detector 14 and converted to a digital signal by the A/D converter 16. The moving target indicator 18 operates in a conventional manner such as through a pulse cancellation technique to remove those components of the return or echo signal indicating a target having a zero or very low velocity.

Figure 2:
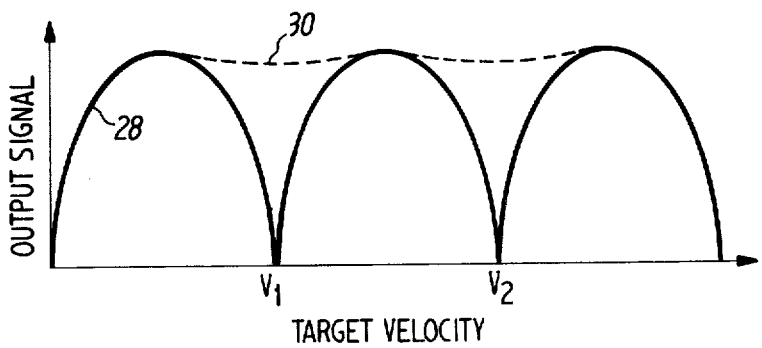
FIG. 2 is a graph illustrating the output signal versus target velocity response of the moving target indicator of FIG. 1.

For example, the moving target indicator 18 may provide an output signal response curve which varies as a function of target velocity as is generally indicated at 28 in FIG. 2. Referring now to FIG. 2, the curve 28 illustrates an analog approximation of a typical output signal amplitude versus target velocity response curve of a moving target indicator with the radar interpulse period held constant. In a digital system the curve of FIG. 2 would be, of course, a series of discrete values generally following the analog curve.

It can be seen from FIG. 2 that with a constant radar interpulse period, target detectability is seriously degraded at various blind target speeds or velocities, e.g., $V_1$ and $V_2$. These blind speeds usually cannot be tolerated and most search radars thus employ a variable interpulse period to provide an MTI output signal response as a function of target velocity which approximates the curve generally indicated at 30.

Although the use of a variable interpulse period may provide essentially constant MTI output signal response as a function of velocity, the variable interpulse period may degrade the performance of the output units such as the illustrated PPI scope 22 and the digital target extractor 24. This problem may be more clearly seen with reference to an exemplary digital target extractor of the type typically employed in digital search radar systems to generate digital target message signals each defining the position (e.g., range, azimuth and sometimes height) of a detected target. For the purpose of this discussion, it is assumed that the output interface unit 20, employed according to the present invention in solving the problems introduced by the use of a variable interpulse period, is not provided.

Figure 3:
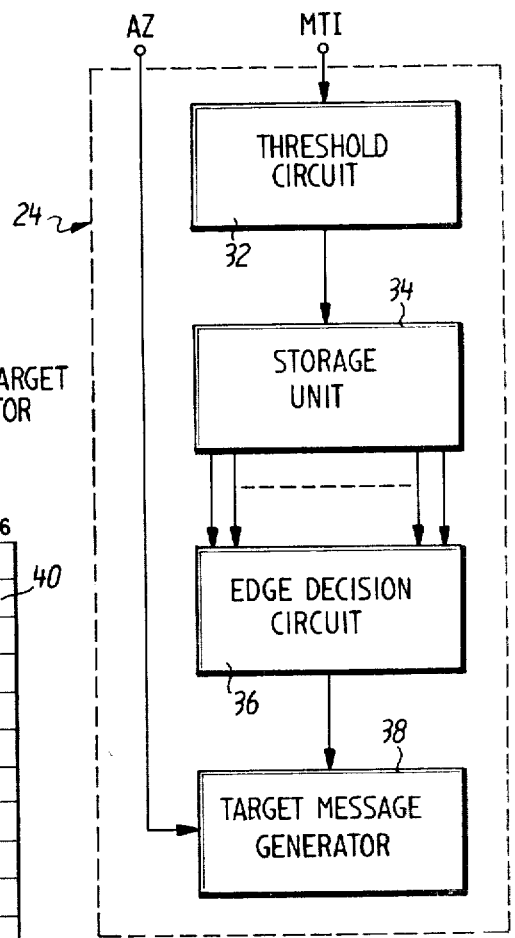
FIG. 3 is a functional block diagram of the digital target extractor of FIG. 1.

Referring now to FIG. 3 wherein a conventional digital target extractor is functionally illustrated, the output signal from the MTI 18 of FIG. 1 may be applied to a suitable conventional digital threshold circuit 32 and the output signal from the threshold circuit 32 may be stored by a memory or storage unit 34 as is hereinafter described in greater detail. The signals stored by the storage unit 34 may be applied in parallel to a target edge decision circuit 36 and an output signal from the edge decision circuit 36 may be applied to a target message generator 38. The azimuth signal AZ from the antenna azimuth indicator 26 may also be applied to the target message generator 38. The digital output signal from the target message generator may then be supplied to a display unit and/or to remote locations via relatively narrow band communication channels such as telephone lines.

In operation, the MTI 18 supplies the digital target extractor with a digital signal indicative of return signal strength at frequent intervals, i.e., every one-half microsecond. The digital threshold circuit 32 makes a yes/no decision as to whether or not the digital signal exceeds a predetermined threshold (typically set to produce a low alarm rate when only receiver noise is present) and generates a single bit digital output signal which may be, for example, a binary ONE for a yes decision and a binary ZERO for a no decision.

Figure 3A:
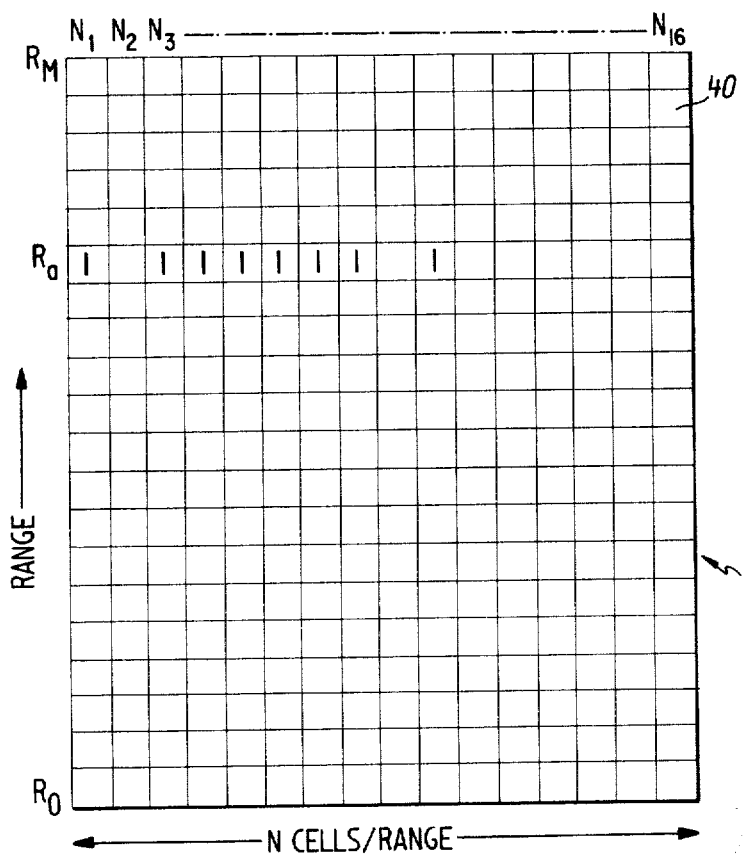
FIG. 3A is a schematic representation of the storage unit of FIG. 3.

The memory or storage unit 34 is typically a drum type memory and stores the yes/no target decision signals, i.e., the binary signals from the threshold circuit 32, as a function of range in individual memory cells. This may be illustrated schematically as shown in FIG. 3A wherein the surface of a drum type memory 34 is depicted as a flat matrix of memory cells. In FIG. 3A, the individual storage cells 40 of the memory 34 are schematically illustrated as squares aligned in rows and columns. Each of the vertical columns $N_1$, $N_2$...$N_{16}$ may represent one track on the drum and each track may store target decision signals for one interpulse period. Although the target decision signals are generated by the threshold circuit 32 every ½ microsecond, the memory cells may conveniently be three microseconds long and may store a binary ONE whenever a yes decision signal is generated during the 3 microsecond range memory cell. Thus, although it may be possible to have six yes decisions during one range memory cell, only one will be stored.

The drum may rotate past the read/write heads of the memory 34 (not shown) in synchronism with the radar transmitting system so that the heads are positioned at range zero ($R_o$) on the drum track when the radar transmits a pulse of energy. When the radar transmits a first pulse, any yes decision signals generated during the interval between this first transmitted pulse and the immediately subsequent transmitted pulse are stored in the appropriate range memory cell 40 on the first drum track $N_1$ (i.e., the first vertical column on the left). When the second radar pulse is transmitted, the data stored on the first drum track $N_1$ is shifted to the right onto the second drum track $N_2$ and current target information is stored on the first drum track $N_1$. In this manner, a "sliding target window" is produced at discrete ranges from zero ($R_o$) to the maximum radar range ($R_m$). This "sliding target window" contains an approximate sample of the yes decision signals generated at the discrete ranges for N interpulse periods including the most recent or current interpulse period ($N_1$). This number N is typically chosen as approximately 16.

All stored decision signals representing the presence of return or echo signals at a particular range are periodically read and applied to the edge decision circuit 36 of FIG. 3. The leading and trailing edges of a target are specified by the edge decision circuit 36 in response to a predetermined number of stored yes decision signals at a particular range. For example, a leading edge of a target may be indicated by the edge decision circuit 36 if 8 of the 16 memory cells at a particular range contain a binary ONE (yes decision signal) and a trailing edge may be indicated when, subsequent to the leading edge indication, 6 of the 16 cells at the same range contain a binary ONE. Thus, for example, at some range $R_n$, a target leading edge may be specified by the edge decision circuit 36.

It can be seen from the above description that the drum storage unit 34 must be synchronized with the radar transmitter so that zero range $R_o$ occurs at the same point on each track of the drum and so that range jitter does not occur. Thus, if the radar interpulse period is varied drastically from one period to the next, extreme difficulty may be encountered in retaining synchronism.

In the past, this problem has been somewhat alleviated by employing a "Destagger" unit as a buffer between the MTI and the output devices. The "Destagger" unit, usually a series of switched delay lines or the digital equivalent thereof, severely limits the choice of interpulse period increments and adds to the overall system cost.

According to the present invention the use of a widely variable interpulse period is permissible through the use of the output interface unit 20 and through operation of the radar system in accordance with a predetermined sequence of interpulse periods. In this regard, the output signal from the MTI 18 is applied to the output interface unit 20 and the output interface unit 20 essentially integrates or sums the MTI output signal for a particular target. Through the proper selection of a sequence of varying interpulse periods, a widely varying range of interpulse periods may be employed in the radar transmitting system while permitting the output units to operate on the basis of interpulse periods which appear to be substantially constant in value. A desirable MTI velocity response is thus achieved without the accompanying degradation of output unit operation.

To accomplish these desirable results, the intervals between radar transmissions, i.e., the interpulse periods, are varied through a predetermined sequence on which the sum of a predetermined plural number of consecutive interpulse periods is a constant equal to a multiple of the average interpulse period. For example, the predetermined sequence of varying interpulse periods or intervals may be represented as $T_1$, $T_2$, $T_3$, $T_4$... $T_n$ and the sum of two consecutive interpulse periods may be equal to twice the average interpulse period $T_{AV}$ of the transmitted radar pulses. Similarly, the sum of three consecutive interpulse periods may be equal to three times the average interpulse period $T_{AV}$. These relationships may be expressed as follows:

$$T_1 + T_2 = T_3 + T_4 = T_5 + T_6 = \ldots = 2T_{AV}; \text{ and,}$$

$$T_1 + T_2 + T_3 = T_4 + T_5 + T_6 = \ldots = 3T_{AV}.$$

Having selected the varying interpulse period of the radar as described above, the constant interpulse period (equal to a multiple of the average interpulse period) is utilized as the output interpulse period or PRF of the radar in supply output data to the PPI display or the digital target extractor. Thus, to the output devices it appears that the radar is operating at a submultiple of its actual average PRF and with a fixed rather than a variable interpulse period. However, for the purpose of target detection by the radar system, including the moving target indicator 18, the radar is actually operating at a variable interpulse period.

To prevent loss of information in the return signal, the output interface unit 20 combines the latent target information derived from wave energy reflected by a target over the period defined by the predetermined plural number of actual radar interpulse periods, preferably through an integration technique. The energy received from the target during those periods in which information is not supplied to the output devices 22 and 24 is thereby fully utilized in improving the ratio of signal to noise in the output data samples in that these output data samples comprise a sum of target echo information. Thus, there is no sacrifice in detectability and, in fact, there may generally be an improvement in detectability.

The output interface unit 20 of FIG. 1 which combines the latent target information signals is preferably a feedback integrator of the type commonly utilized in search radar systems for other purposes and thus its use as the output interface unit 20 on a shared basis, for example, involves virtually no additional hardware in the radar system. In the preferred embodiment of the invention, the output interface unit 20 is preferably a digital feedback integrator of the type disclosed and claimed in U.S. patent application Ser. No. 232,150, filed Mar. 6, 1972, by John W. Taylor, Jr., and assigned to the assignee of the present invention. The disclosure of the Taylor, Jr. application is hereby incorporated herein by reference.

With the feedback integrator disclosed in the aforementioned patent application and illustrated in FIG. 4, the output signal from the MTI 18 of FIG. 1 may be sampled every one-half microsecond starting at a time zero dictated by each transmitted radar pulse. The digital signal from the MTI 18 has been intentionally limited in amplitude so that a single pulse of interference, no matter how strong, cannot produce a detectable output from the feedback integrator. The MTI signal may be applied to a plus or add input terminal of a summer or adder 50 and the output signal from an output terminal 51 of the summer 50 may be limited by a top and bottom limiter 52. The output signal from the limiter 52 may be applied via an output terminal 53 to a suitable storage or memory unit 54, to a digital threshold 58 and to a digital to analog converter 56. The threshold level of the digital threshold circuit 58 may be controlled by a signal from a suitable digital threshold control circuit 57 as illustrated and the gating of the output signal at the output terminal 53 to the D/A converter 56 and the digital threshold circuit 58 may be controlled at a submultiple of the radar PRF by the TMG signal.

The output signal from the storage unit 54 may be applied to a plus input terminal of the summer 50 and through both a $2^{-n}$ multiplier 60 and a truncate circuit 62 to a minus or subtract input terminal of the summer 50. A bias signal from a suitable bias circuit 64 may be applied to a plus input terminal of the summer 50.

It should be noted that with the preferred output interface unit illustrated in FIG. 4, the digital threshold circuit 58 performs the same function as the threshold circuit 32 previously discussed in connection with the digital target extractor of FIG. 3. This function may be performed in either the output interface unit or the digital target extractor but is not required in both units.

Figure 5:
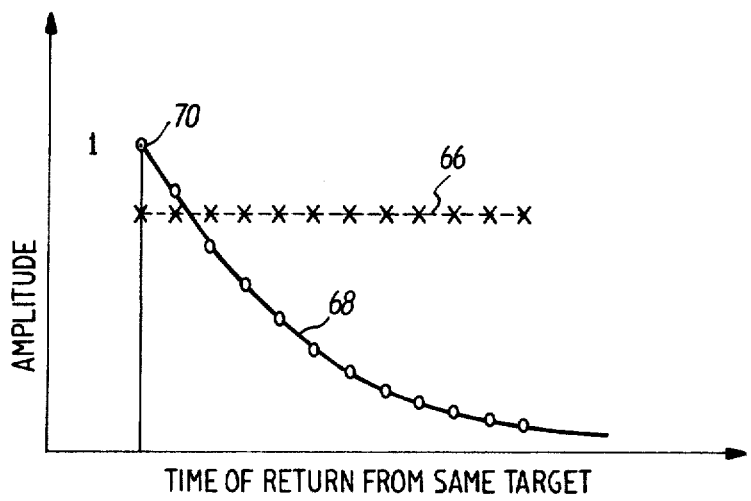
Figure 6:
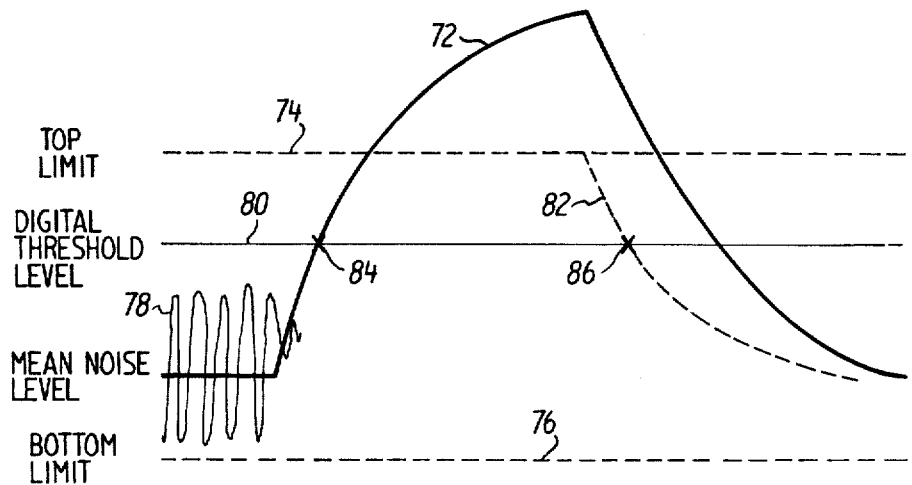

The operation of the circuit of FIG. 4 may be more clearly understood with reference to the aforementioned Taylor, Jr. application and with reference now to FIGS. 5 and 6. Referring now to FIG. 5, the amplitudes of the echoes received as the beam scans past a target at a particular range may be represented by the curve 66. It should be noted that since the radar is pulsed, the amplitudes are actually discrete values as is indicated by the "X's" along the curve 66. Moreover, the limiting of the target information signals as was previously mentioned results in a substantially rectangular shape of the curve 66, i.e., substantially equal discrete amplitude values, for strong target echoes.

Each of the several target information signals derived from the target echoes received as the radar antenna scans past a target is weighted in accordance with a curve 68 which, in this embodiment employing the feedback integrator, is exponential. The first target information signal may be given a weight of 1 as is generally indicated at 70 and may be stored by the storage unit 54. Assuming that n is selected as 3 for the multiplier 60, the next target information signal from a specific range is summed with the stored information signal at the same range minus 1/8th of the stored information signal (i.e., the second target information signal is summed with 7/8ths of the first target information signal). This sum value is stored in the storage unit 54 and the third target information signal is similarly summed with the negative and positive feedback signals from the storage unit 54. The resultant output signal at the output terminal 51 of the summer 50 will thus follow an exponential curve 72 as is illustrated in FIG. 6. The output signal amplitude may be expressed in terms of three successive target echoes $A_1$, $A_2$, and $A_3$ as follows:

| Echo No. | Output Signal |
|---|---|
| $A_1$ | $A_1$ |
| $A_2$ | $A_2 + \frac{7}{8}A_1$ |
| $A_3$ | $A_3 + \frac{7}{8}A_2 + (\frac{7}{8})^2 A_1$ |

Referring to FIGS. 4 and 6, the output signal at the output terminal 51 of the summer 50 may be represented by the curve 72 of FIG. 6 as was previously described. The top and bottom limiter 52 may set top and bottom limits on the amplitudes of the output signal at the output terminal 53 as is generally indicated respectively at 74 and 76 in FIG. 6. The digital threshold level 80 of the digital threshold circuit 58 may be set with respect to the noise level 78 as was previously described.

The bottom limit 76 stabilizes the feedback integrator and generally maintains the respective levels as indicated in FIG. 6. As the signal at the output terminal 51 of the summer 50 (curve 72) rises exponentially, the maximum target echo signal amplitude is limited by the top limit 74 resulting in an output signal at the output terminal 53 of the top and bottom limiter 52 which generally follows the curve 82 substantially independently of target signal strength. The digital threshold circuit 58 will provide yes decision signals for signals between the points 84 and 86.

While the preferred feedback technique of the output interface unit 20 of FIG. 4 provides the exponential response described in connection with FIGS. 5 and 6, various signal combining techniques may be utilized to integrate or sum the groups of 2, 3 or more target echoes, either directly or in accordance with a predetermined relationship as in the preferred embodiment, into a lesser number of output data samples. The particular exponential technique disclosed is, however, preferred in that it provides a desirable match between the range and azimuth resolution of the output interface unit 20 and that of the radar system.

The operation of a radar system according to the present invention, employing the output interface unit of FIG. 4, may be exemplified by the following table of parameters:

TABLE I

TYPICAL PARAMETERS

|  | Example A | Example B |
|---|---|---|
| Radar PRF (average) | 330 | 780 |
| Echoes Combined | 2 | 3 |
| Output PRF | 165 | 260 |
| Maximum Display Range (in Nautical Miles — NM) on Common PPI (with 10% Recovery Time) | | |
| Radar Echoes | 220 NM | 100 NM |
| IFF Replies | 440 NM | 270 NM |
| Pulses Per Beamwidth | | |
| Radar | 14 | 27/33/66 |
| Output | 7 | 9/11/22 |
| Range Resolution in Nautical Miles | | |
| Radar | .04 | .08 |
| Feedback Integrator | .04 | .08 |
| Digital Target Extractor | .25 | .30 |
| PPI | 1 | 1 |
| Number of Interpulse Periods | | |
| Radar | $2 \times 4 = 8$ | $3 \times 8 = 24$ |
| Output | 1 | 1 |

It can be seen from the foregoing description that the present invention provides numerous advantages over known search radar systems. For example, the present invention provides a fixed output interpulse period, compatible with both digital target extractors which utilize drum storage and PPI displays, eliminating the additional "Destagger" hardware employed in the past.

Because of this fixed output interpulse period or PRF, the invention permits PPI display capability 2 or 3 times that of the radar's ambiguity limit, allowing IFF replies from longer range targets to be displayed simultaneously. Since the target information is combined for plural target echoes and the sampling rate is less than the actual radar PRF, the invention reduces the output data sampling rate to a modest number of data output pulses per beamwidth, generally more compatible with the strong capacity of digital target extractors.

Moreover, the preferred integration process of the invention can be controlled to match the requirements of the radar system. With the preferred exponential integration, the range resolution is more compatible with the radar than that obtained employing only the characteristics provided by the usual PPI or digital target extractor.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for providing target information signals at a fixed data interval in a pulsed radar system which radiates with variable interpulse periods comprising the steps of:

transmitting pulses of wave energy with an interpulse spacing which varies on a pulse-to-pulse basis about a predetermined average interpulse period;

deriving target information signals from consecutive return pulses of the wave energy at the variable interpulse period of the radar;

combining a plural number of consecutive target information signals derived from the reflected pulses of wave energy; and, utilizing the combined target information signals at a fixed data interval equal to the average interpulse period of the radar multiplied by an integer number.

2. The method of claim 1 wherein the plural number of consecutive target information signals are combined by:

storing a first target information signal derived from a first pulse of the wave energy returned from a target; and, summing a fractional portion of the first target information signal with a second target information signal derived from the second consecutive pulse of the wave energy returned from the target.

3. The method of claim 2 wherein the fractional portion is ⅞.

4. The method of claim 3 wherein at least two consecutive target information signals are combined and wherein the fixed data interval is twice the average interpulse period of the radar.

5. The method of claim 1 wherein two consecutive target information signals are summed and wherein the fixed data interval is twice the average interpulse period of the radar.

6. The method of claim 1 wherein three consecutive target information signals are summed and wherein the fixed data interval is three times the average interpulse period of the radar.

7. The method of claim 6 wherein the three consecutive target information signals are combined by:

storing a first target information signal derived from a first pulse of the wave energy returned from a target;

summing ⅞ of the stored first target information signal with a second target information signal derived from the second consecutive pulse of the wave energy returned from the target;

storing the sum of ⅞ of the first and the second target information signals; and, summing ⅞ of the stored sum signal with a third target information signal derived from the third consecutive pulse of the wave energy returned from the target.

8. A method for interfacing a pulsed radar system having a varying interpulse period with a constant frequency output device comprising the steps of:

deriving target information from pulses of wave energy reflected by a target at varying intervals determined by the interpulse period of the radar, the intervals varying in accordance with a sequence wherein the sum of the intervals in consecutive groups of varying intervals each containing a like predetermined plural number of varying intervals is a constant period;

combining target information derived from the reflected pulses of wave energy over at least one constant period defined by the sum of the predetermined plural number of intervals in the consecutive groups of the varying intervals; and, generating an output signal from the combined target information at fixed intervals each equal in length to the constant period defined by the sum of the predetermined plural number of intervals in the consecutive groups of the varying intervals.

9. The method of claim 8 wherein each consecutive group of the varying intervals comprises two consecutive intervals and wherein the latent target information derived over the constant period defined by each consecutive group of two intervals is combined by exponentially weighted integration.

10. The method of claim 8 wherein each consecutive group of the varying intervals comprises three consecutive intervals and wherein the latent target information derived over the constant period defined by each consecutive group of three intervals is combined by exponentially weighted integration.

11. The method of claim 8 wherein the latent target information derived over a constant period is combined by summing the latent target information from a specific point in range with a fractional protion of previously stored data, the summation providing new stored data replacing the previously stored data.

12. A system for providing target information signals at a fixed data interval in a pulsed radar system which radiates with variable periods comprising:

means for transmittng pulses of wave energy with an interpulse spacing which varies on a pulse-to-pulse basis about a predetermined average interpulse period;

means responsive to said deriving means for combining a plural number of consecutive target information signals derived from the reflected pulses of wave energy; and, means responsive to said combining means for utilizing the combined target information signals at a fixed data interval equal to the average interpulse period of the radar multiplied by an integer number.

13. The system of claim 12 wherein said combining means comprises means for summing a target information signal from a specific point in range with a fractional portion of stored data, the summing means providing the resultant sum as new stored data in place of the previously stored data.

14. The system of claim 12 wherein said combining means comprises:
    means for storing a first target information signal derived from a first pulse of the wave energy returned from a target; and,
    means for summing a fractional portion of the first target information signal with a second target information signal derived from a second consecutive pulse of the wave energy returned from the target.

15. The system of claim 14 wherein the fractional portion is ⅞.

16. The system of claim 15 wherein two consecutive target information signals are combined by said combining means and wherein the fixed interpulse period is twice the average interpulse period of the radar.

17. The system of claim 12 wherein two consecutive target information signals are combined and wherein the fixed interpulse period is twice the average interpulse period of the radar.

18. The system of claim 12 wherein three consecutive target information signals are combined and wherein the fixed interpulse period is three times the average interpulse period of the radar.

19. The system of claim 18 wherein said combining means comprises:
    means for storing digital signals;
    means responsive to said storing means and said deriving means for summing ⅞ of a signal stored by said storing means with a target information signal from said deriving means; and,
    circuit means for applying the sum signal from said summing means to said storing means, said sampling means being responsive to said summing means.

20. A system for interfacing a pulsed radar system having a varying interpulse period with an output device operable at a fixed interpulse period comprising:
    means for transmitting pulses of wave energy and deriving target information signals from the transmitted pulses of wave energy reflected by a target at varying intervals determined by the varying interpulse period of the radar, the intervals varying in accordance with a sequence wherein the sum of the intervals in consecutive groups of varying intervals each containing a like predetermined plural number of varying intervals defines a constant interpulse period;
    means for combining target information derived from the pulses of wave energy reflected from the same target over a constant period defined by the sum of the predetermined plural number of intervals in the consecutive groups of the varying intervals; and
    means for generating an output signal from the combined target information at fixed intervals each equal in length to the constant period defined by the sum of the predetermined plural number of intervals.

21. The system of claim 20 wherein said combining means comprises means for summing the target information from a specific point in range with a fractional portion of stored data, said summing means providing new stored data in place of the previously stored data.

22. The system of claim 21 wherein each consecutive group of intervals comprises two consecutive intervals and wherein said combining means comprises an exponentially weighted, feedback integrator.

23. The system of claim 21 wherein each consecutive group of intervals comprises three consecutive intervals and wherein said combining means comprises an exponentially weighted, feedback integrator.

24. The system of claim 20 wherein each consecutive group of intervals comprises two consecutive intervals and wherein said combining means comprises an exponentially weighted, feedback integrator.

25. The system of claim 20 wherein each consecutive group of intervals comprises three consecutive intervals and wherein said combining means comprises an exponentially weighted, feedback integrator.

* * * * *